Dec. 23, 1941.  L. J. MOST  2,267,127

ERASER MOUNTING

Filed Jan. 11, 1941

INVENTOR.
L. J. Most
BY
his attorney

Patented Dec. 23, 1941

2,267,127

UNITED STATES PATENT OFFICE 2,267,127

ERASER MOUNTING

Lucifer J. Most, Hudson County, N. J.

Application January 11, 1941, Serial No. 374,068

3 Claims. (Cl. 120—38)

My invention relates to eraser mounting for mechanical pencils and the object thereof is to utilize the lateral resiliency of the rubber eraser for providing the necessary pressure to maintain a proper frictional engagement between the cap for the eraser and the mounting for same.

The object of the invention is to provide a simple, inexpensive and efficient eraser mounting by means of which any wear of the rubber eraser can be easily or quickly compensated, without reducing the frictional engagement between the cap and the eraser mounting.

In the type of eraser mountings to which my invention appertains, it is common to provide a cap for the eraser, which is frictionally mounted on the upper end of the barrel, but due to the frequent removal of the cap for the use of the eraser, the frictional contact between the cap and the support for same wears off and the cap becomes loose. This deficiency I am overcoming by utilizing the lateral resiliency of the rubber eraser to prevent this reduction in friction of the cap with the eraser mounting by the constant use of the eraser.

Figure 1:
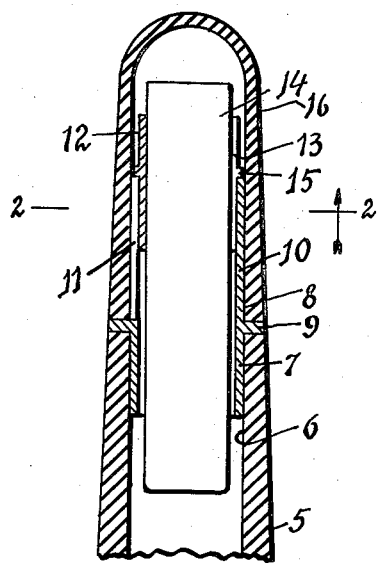
Figure 2:
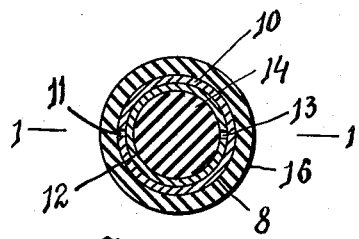

In the appended drawing forming part of this application, Figure 1 is a fragmental section on line 1—1 Figure 2 of an eraser mounting, embodying my invention, and Figure 2 is a cross-section on line 2—2 Figure 1.

Referring to the drawing, 5 is the upper part of a pencil barrel provided with a suitable bore 6, into which is tightly fitted the lower end 7 of a sleeve 8. The sleeve 8 is provided with a flange 9 which rests on the end of the barrel when the lower portion 7 of the sleeve is fitted into the bore 6 of the barrel 5. The portion 10 of the sleeve which projects above the flange, has a longitudinal slit 11, permitting it to expand laterally.

Fitting into the splitted portion 10 of the sleeve 8 is an eraser holder 12 in the shape of a sleeve which has a longitudinal slit or gap. Fitting into the longitudinal splitted holder 12 is a rubber eraser 14, cylindrical in shape. The eraser holder 12 being split through its entire length opens up under the lateral pressure of the rubber eraser 14, tending to widen the gap 13 when the rubber is fitted into the holder 12. In turn, when the holder 12 with the rubber therein is fitted into the split portion 10 of the sleeve 8, it tends to widen the gap of the slit 11.

To prevent the holder 12 from being pushed too far into the split portion 10 of the sleeve 8, it is provided with a flange or bead 15 between its end to engage the end of the upper part 10 of the sleeve 8 and forms a stop for the holder 12 in the sleeve 8.

Due to the lateral expansion of both the holder 12 and the portion 10 of the sleeve 8 under the lateral pressure of the rubber eraser 14, a pressure is exerted on a cap 16 which is made to fit the split portion 10 of the sleeve 8, thereby providing a constant pressure between the contacting surfaces of sleeve portion 10 and the cap 16. The flange 9 of the sleeve 8 forms an abutment for the cap on the barrel 5.

By providing an eraser mounting as described, I provide a constant pressure on the cap from the later resiliency of the rubber eraser, thereby insuring a perfect and constant frictional engagement between the cap and the eraser mounting, which is not subject to wear by the constant removal of the cap from the mounting.

I claim:

1. An eraser mounting for a pencil comprising, a longitudinally split cylindrical sleeve adapted to be fitted on to a cylindrical rubber eraser, said sleeve adapted to be laterally expanded when engaged by an eraser, a second sleeve having a portion thereof longitudinally slit, said first sleeve being adapted to fit frictionally into the slit portion of said second sleeve, and a cap adapted to frictionally engage the exterior of the longitudinally slit portion of said second sleeve.

2. An eraser mounting for a pencil comprising in combination, a barrel having a bore on its upper end, a sleeve fitting tightly into said bore, said sleeve having a longitudinally slit portion thereof above the barrel, a longitudinally slit sleeve made to fit frictionally into the slitted portion of the first sleeve, said slitted sleeve being adapted to expand laterally when fitted on to a cylindrically shaped rubber eraser, and a cap frictionally engaging the slitted portion of the first sleeve.

3. An eraser mounting for a pencil comprising in combination, a barrel having on its upper end a projecting slitted sleeve portion, a longitudinally slitted sleeve fitting frictionally into the projecting slitted sleeve portion, said slitted sleeve being adapted to expand laterally when engaging a rubber eraser, and a cap fitted frictionally on the exterior of the projecting slitted sleeve portion.

LUCIFER J. MOST.